March 7, 1967 P. W. HANNAN 3,308,468
MONOPULSE ANTENNA SYSTEM PROVIDING INDEPENDENT CONTROL IN A PLURALITY OF MODES OF OPERATION
Filed May 22, 1961
3 Sheets-Sheet 1

3,308,468

MONOPULSE ANTENNA SYSTEM PROVIDING INDEPENDENT CONTROL IN A PLURALITY OF MODES OF OPERATION

Peter W. Hannan, Northport, N.Y., assignor to Hazeltine Research, Inc., a corporation of Illinois Filed May 22, 1961, Ser. No. 111,542

3 Claims. (Cl. 343—777)

This invention relates to independent control of the modes of operation of an antenna system operating simultaneously in several modes. The invention is particular applicable to antenna systems used with monopulse radar systems where independent control of the sum and difference modes is desirable but has not been available in the prior art. The invention will be described in the environment of a monopulse system although it is not limited to such applications.

For the purposes of this specification, the word "antenna" is defined as a structure for effecting the transition between a free-space electromagnetic wave and a guided electromagnetic wave and may, for example, take the form of a horn or dipole. An array of antennas, as defined, can be used, for example, as the "feed" in an antenna system including a focusing element, such as a reflector, or it can be used directly in an antenna system which does not include any focusing element. An "antenna system" is defined here as an antenna or array of antennas in combination with other components which may include a focusing element, comparator circuits, etc., as will be explained more fully.

In the design of monopulse antenna systems it has been customary to assume that some type of compromise is required between the several modes of operation. However, this is not necessary and the present invention makes it possible to optimize in all modes simultaneously. For an ordinary single mode antenna system the optimum design for maximum antenna system gain is well known. In the case of a monopulse antenna system, there are usually a sum and two difference modes and it has not been possible to design for simultaneous optimum performance in all these modes. The particular compromise made is dependent upon system requirements and the relative importance of the various modes. In all such designs the compromise causes substantial degradation of some of the important antenna system properties. For example, in an antenna system having a feed and a focusing element, degradation typically affects the difference mode properties, such as gain, sidelobe levels, spill-over radiation and criticalness of misalignment.

As is well known, antenna systems are reciprocal in nature, operating equally well in reception and transmission of energy. Monopulse radar systems of the type to be described utilize the present invention during reception only, and the following description relies mainly upon a reception viewpoint except where a transmission viewpoint is easier. Reliance on one or the other of these viewpoints at particular points in the description should not be allowed to obscure the fact that the invention is equally applicable to reception and transmission.

FIG. 1.—PRIOR ART MONOPULSE SYSTEM

While familiarity with prior art monopulse antenna systems is assumed, a simplified discussion of the problems in prior art systems is desirable before pursuing the subject of an optimum monopulse antenna system. In one common type of monopulse radar, the antenna system consists of three elements: a comparator, a feed and a focusing element. The comparator is a circuit network which adds and subtracts voltages in such a way as to convert a signal in any of the three channels to the proper signals at the feed. Thus, referring to FIG. 1 which illustrates a prior art system, comparator 14 comprises an arrangement of transmission paths (which may be waveguide, for example) interconnected by hybrid junctions, such as junction 15. The feed in FIG. 1 comprises a cluster of four small antennas in the form of horns 10, 11, 12 and 13. The feed radiates a divergent beam toward the focusing system to provide the desired field at the main aperture of the antenna system. The focusing system may include a lens or reflecting dish which is large compared with the feed, and which converts the spherical wave front to a flat one, giving rise to a narrow beam of radiation. The focusing element 16 in FIG. 1 may be considered to be a reflecting dish.

There are three channels connected to the comparator and three modes of operation for the antenna system. These are called the sum (S), azimuth difference (A), and elevation difference (E) modes. When coupled to the transmitter, the sum mode provides illumination of a distant target. When coupled to a receiver, it provides range information and a reference signal. The azimuth and elevation difference modes are coupled to receivers whose signals, when combined with the reference sum signal, provide azimuth and elevation angle information, respectively. While it is true that during actual monopulse radar operation only the sum mode exists in transmission, it is common practice to consider all three modes in transmission when this eases the task of analysis (by reciprocity the antenna pattern are the same whether obtained in transmission or reception).

Considering the illumination of the reflector during transmission, it is well known that in order to obtain maximum efficiency in the sum mode the feed size and reflector relationship should be such that the illumination is tapered down at the edge of the reflector by about 10 db. This is shown in FIG. 1 by Curve S1 which represents the 10 db contour of the sum power density. (In FIG. 1, the power density represented by the various dashed contours would, of course, strike the side of the reflector which is hidden in the drawing—it may aid in understanding the drawings to assume the reflectors to be transparent optically.) In the case of the difference mode, considerations of maximum efficiency and low sidelobes lead to a similar conclusion, that is, that the illumination should be appreciably tapered down at the edge of the reflector. In addition, some of the special problems of the difference mode, such as criticalness to feed tilt and edge asymmetries place a premium on low edge illumination. For simplicity, it may be assumed that the difference illumination should be tapered down by about the same amount as the sum illumination.

But, referring to FIG. 1 where the system has been optimized for the sum mode, it will be seen that the difference illumination reaches a maximum close to the edge of the reflector, as shown by the contours A1, A2, E1, and E2. This is the result of using the four horns 10, 11, 12 and 13 substantially as one horn in the sum mode but substantially as two horns for each of the difference modes. Thus, in the elevation difference mode, horns 10 and 11 are excited in one polarity and horns 12 and 13 are excited in the other polarity, and the energy radiated has two main peaks of opposite polarity which are displaced equal amounts off the antenna system axis and which result in a width of useful power distribution in the vertical direction which is substantially twice as wide at the reflector as is the sum power distribution. In a horizontal direction this elevation mode power has substantially the same distribution as the sum power. In the azimuth difference mode, horns 10 and 12 are excited in one polarity, as are horns 11 and 13, and the result is a substantially double-width power distribution in a horizontal plane as compared to the sum mode (corresponding to the spread in the vertical direction for the elevation mode). In this system at least half of the power in the difference modes goes into spillover (i.e. misses the reflector) so that there is about a 3 db loss in the difference signal compared with the optimum condition, and the difference peak gain would be about 6 db below the sum gain. The high illumination of the edge of the reflector creates high sidelobes in the difference pattern, and also makes the difference mode sensitive to antenna system misalignment and edge asymmetries; furthermore, the large amount of spillover permits spurious signals of both a coherent and incoherent nature to enter the difference channels.

If the feed size had been optimized for the difference modes, the sum illumination would be excessively narrow. The sum mode would utilize only about half of the reflector if performance were optimized for one difference mode, and a reduction of about 3 db in sum gain would result. Attempting to optimize the feed size for both difference modes would create additional losses. While it is true that a feed size might be utilized which strikes a compromise between the optimum sum mode and optimum difference mode performance, the defects mentioned above would still be present to a large degree.

The above discussion has been limited to problems in the beam width or size of the antenna pattern produced by an array of antennas. It is well known that the sidelobe suppression of an antenna array pattern is also very important and prior art monopulse systems have been rather inefficient with respect to this and other considerations. This is true not only when the array comprises the feed of an antenna system having a focusing element, but also when the array itself constitutes the antenna system. Thus, it is evident that the ordinary monopulse antenna design as described above imposes a limitation which degrades the antenna system performance in a number of ways, and some manner of optimizing performance in all modes simultaneously is extremely desirable.

It is an object of this invention, therefore, to provide new and improved antenna systems which avoid one or more of the disadvantages of the prior art arrangements.

It is a further object of this invention to provide an antenna system allowing operation in a plurality of modes with improved efficiency.

It is an additional object of this invention to provide an antenna system allowing any desired degree of independent control in a plurality of modes of operation.

In accordance with the invention a monopulse antenna system providing independent control in a sum and two difference modes of operation comprises a central group of four antennas arranged to simultaneously form upper and lower pairs of antennas and left and right pairs of antennas; an outer group of antennas including antennas above, below, right, and left of the four central antennas; a first group of hybrid junctions combining signals from the four central antennas to form a final sum mode signal, a preliminary elevation difference mode signal, and a preliminary azimuth difference mode signal; a second group of hybrid junctions combining signals from the upper and lower outer antennas with the preliminary elevation difference mode signal to form a final elevation difference mode signal; and a third group of hybrid junctions combining signals from the right and left outer antennas with the preliminary azimuth difference mode signal to form a final azimuth difference mode signal.

For a better understanding of the present invention, together with other and further objects thereof, reference is had to the following description taken in connection with the accompanying drawings, and its scope will be pointed out in the appended claims.

Figure 6:
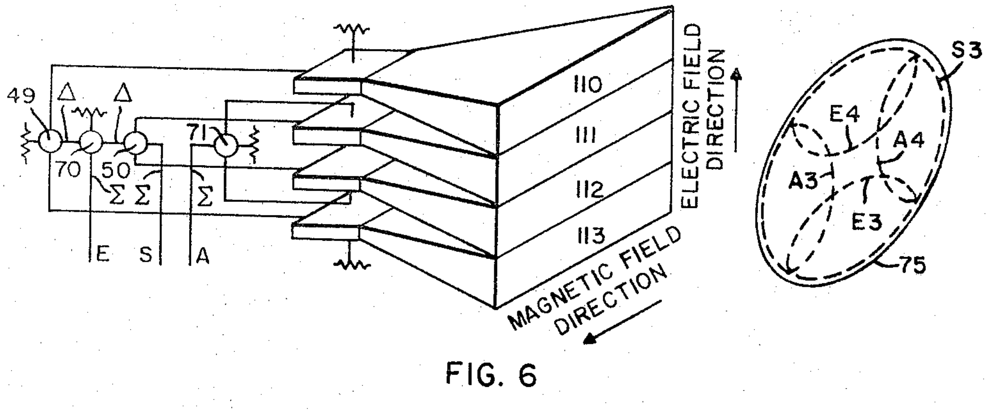

FIGS. 4*a*, 4*b*, 4*c*, 4*d*, 4*e* and 4*f* illustrate the horns utilized in the three operating modes and their effective radiating patterns;

FIGS. 5*a* and 5*b* are two views of a multimode horn in accordance with the invention; and FIG. 6 illustrates a third antenna system providing independent control by means of a multimode feed array in accordance with the invention.

Figure 1:
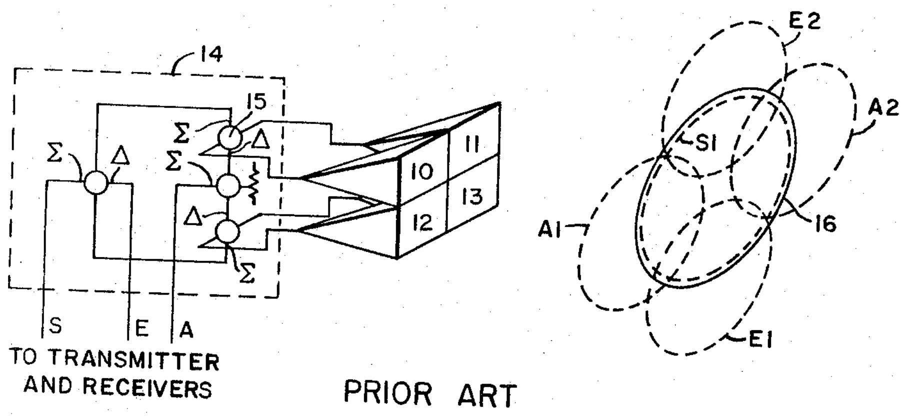
FIG. 1 illustrates a prior art monopulse antenna system.

The primary fault of prior art monopulse antenna systems may be considered to be the inability to produce feed patterns of similar directivity in each mode. This is clearly shown by the power contours of FIG. 1, wherein large amounts of azimuth and elevation power are lost in spillover.

The present invention includes the realization that the way to get feed array patterns of similar directivity in each mode is to change the size of the feed array, either actually or effectively, for each of the various modes involved.

As used in this specification, "independent control" is defined as the ability of an antenna system to provide patterns for each mode of a plurality of modes of operation without any limitation arising from the presence of the other modes. It will be noted that the operation of any focusing element is immaterial in considering independent control. Practically, independent control of an antenna array will usually take the form of the ability to provide patterns of substantially similar beam width in each mode for signals with different characteristics in each mode. These different characteristics are such that such mode requires a different antenna system capability to allow similar beam widths, as was brought out in the earlier discussion of the prior art, especially with reference to the power contours of FIG. 1.

FIG. 2.—MONOPULSE ANTENNA SYSTEM ALLOWING COMPLETE INDEPENDENT CONTROL

Figure 2:
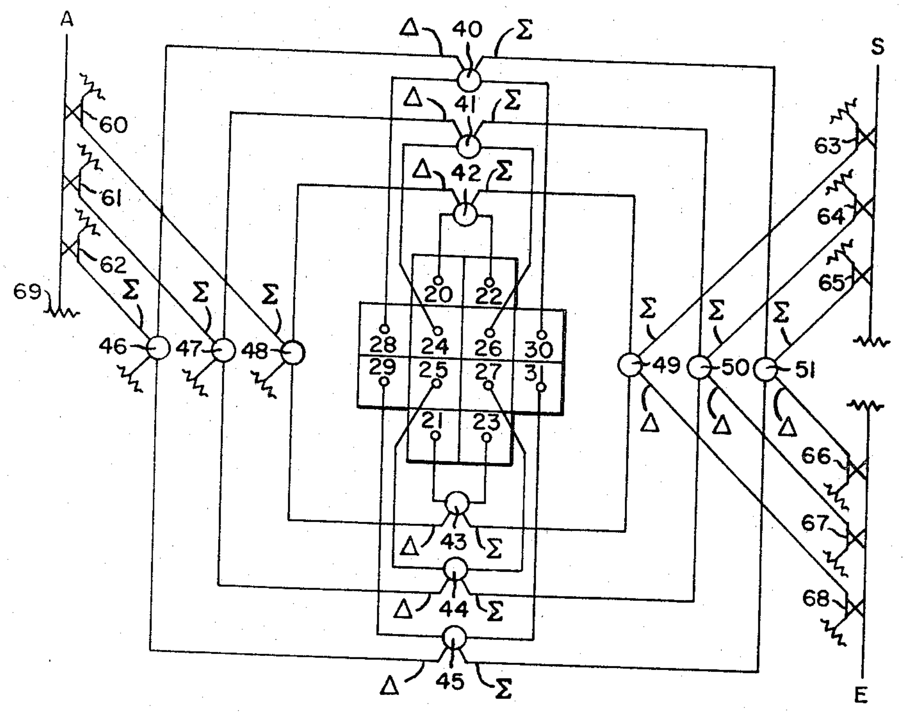
FIG. 2 illustrates an antenna system capable of providing any desired degree of independent control in accordance with the invention.

Referring now to FIG. 2, there is shown an example of an antenna system providing independent control in a plurality of modes of operation. This antenna system includes an array of antennas having a plurality of outputs. These antennas are shown as boxes 20–31, inclusive, each of which may represent a horn, dipole or other device and each of which is shown as having one output indicated schematically as the dot at the center of these boxes. The antenna system further includes comparison means coupled to these outputs. These comparison means are shown as hybrid junctions 40–51, inclusive. The antenna system also includes independent control means coupled to the comparison means. These independent control means are shown as directional couplers 60–68, inclusive. Many resistive terminations are used to terminate particular connections in the arrangements illustrated in the drawings; a representative termination is labeled 69 in FIG. 2.

FIG. 2 has been limited to an array of 12 antennas for purposes of illustration, but in observing FIG. 2, it will be apparent that this system can be utilized with any desired number of antennas. The interconnections between the antennas, the hybrid junctions and the directional couplers follow a logical pattern and may be readily expanded as the number of antennas desired increases. The antennas, hybrid junctions and directional couplers are shown in FIG. 2 as being interconnected by lines. These lines represent transmission paths which may be waveguide, coaxial transmission lines, etc.

In considering the operation of the antenna system of FIG. 2 it will be instructive to first examine the interconnections illustrated, from the following points of view:

(I) Each of the independent control means (directional couplers 60–68, inclusive) are arranged to selectively couple energy from one of the comparison means (hybrid junctions 46–51, inclusive) to one of the mode outputs S, A or E. Each directional coupler is designed to provide only the degree of coupling desired in each particular case (each hybrid junction provides a uniform degree of coupling).

(II) Each of the hybrid junctions 46–51, inclusive, is coupled (through certain of the hybrid junctions 40–45, inclusive) to four antennas which are symmetrically located with respect to the vertical and horizontal center lines of the antenna array. Thus, junction 49 is coupled to antennas 20 and 22 through junction 42 and to antennas 21 and 23 through junction 43.

(III) Each of the hybrid junctions 40–45, inclusive, is coupled to two antennas which are symmetrically located with respect to the vertical center line of the antenna array. Thus, junction 42 is coupled to antennas 20 and 22.

(IV) For the S mode, energy from all antennas is selectively added to form the final S mode signal.

For example, energy from antenna 20 is added to that from antenna 22 by junction 42 and appears at the Σ output of junction 42. Similarly, the sum of energy from antennas 21 and 23 appears at the Σ output of junction 43. These two Σ outputs are then added in junction 49 and the sum appears at the Σ output of junction 49. This Σ output is then coupled into the S channel with a desired degree of coupling by directional coupler 63. Similarly, outputs from the other two groups of four antennas (24–27, inclusive, and 28–31, inclusive) are coupled into the S channel with desired degrees of coupling by couplers 64 and 65.

(V) For the E mode, in each group of four antennas, energy from the two antennas above the horizontal center line is added, and this resultant is subtracted from the additive sum of the energy from the two antennas (of the particular group of four antennas) below the center line. This resultant is then selectively coupled to the E channel.

For example, energy from antennas 20 and 22 is added and appears at the Σ output of junction 42 and energy from antennas 21 and 23 is added and appears at the Σ output of junction 43. These two Σ outputs are then subtracted and the resultant appears at the Δ output of junction 49. This Δ output is coupled to the E channel by directional coupler 68.

(VI) For the A mode, in each group of four antennas, energy from one of the two antennas above the horizontal center line is subtracted from the output from the other, and this resultant is added to the difference between the outputs of the two antennas (of the particular group of four antennas) below the center line. This resultant is then selectively coupled to the A channel.

For example, energy from antenna 20 is subtracted from energy from antenna 22 and the resultant appears at the Δ output of junction 42. Energy from antenna 21 is subtracted from energy from antenna 23 and this resultant appears at the Δ output of junction 43. These two Δ outputs are then added and appear at the Σ output of junction 48. This Σ output is coupled to the A channel by directional coupler 60.

To summarize, in the E mode, energy from two antennas is first added and this resultant subtracted from the additive sum of energy from two other antennas. In the A mode, energy from two antennas is first subtracted and this resultant added to the resultant of the difference of outputs of two other antennas. The order of adding and subtracting is of no import. The whole system could just as well have been designed so that the E outputs were formed by a subtraction and then an addition instead of by the reverse process as here. This is true of the A mode also. The addition and subtractions may, if desired, be intermixed (as will be seen with reference to FIG. 3).

The FIG. 2 arrangement will allow any degree of independent control desired, at the cost of additional components. Exactly how such independent control is achieved will be clarified in the description of the simpler and more easily explainable FIG. 3 arrangement. It is sufficient at this point if the comparison process (as carried out by the hybrid junctions) and the independent control process (as carried out by selective directional coupling) in forming the final mode signals are understood. It will be understood that the FIG. 2 arrangement has utility in many types of antenna systems, including systems which incorporate a focus-element as well as those which do not.

FIG. 3.—MONOPULSE ANTENNA SYSTEM WITH INDEPENDENT CONTROL

Figure 3:
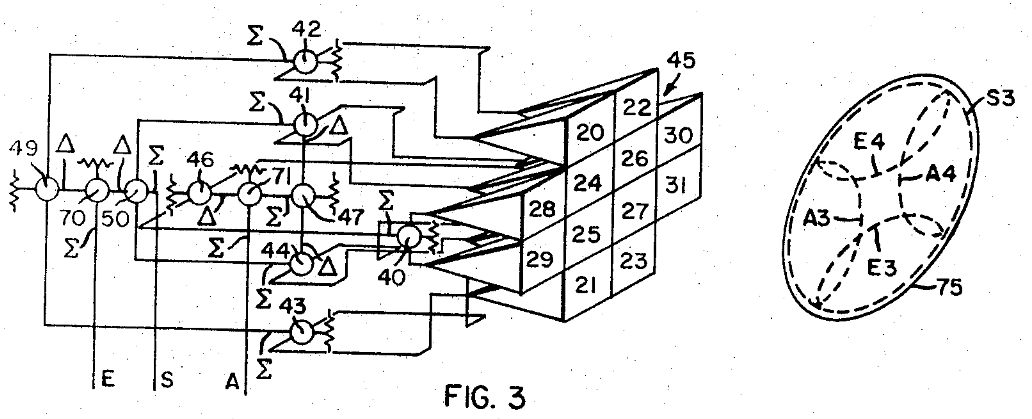
FIG. 3 illustrates a second antenna system providing independent control in accordance with the invention.

Referring now to FIG. 3, there is shown a monopulse antenna system providing independent control in three modes of operation. This system includes an array of twelve horns 20–31, inclusive, a first group of hybrid junctions 40–47, 49 and 50 coupled to the horns and a second group of hybrid junctions 70 and 71 coupled to the first group. (Junction 45 is in a position corresponding to junction 40, but hidden behind the horns.) The numbering of hybrid junctions in FIG. 3 corresponds with that of FIG. 2 except that junctions 40 and 45 are connected slightly differently. This system also includes a focusing system, shown as reflector 75, in spaced relation to said array of horns.

In this arrangement, hybrid junctions 40–45, inclusive, are described by (III) above. Junctions 46, 47, 49 and 50 are described by (II) above. The principles of (IV), (V), and (VI) above are applicable in describing the formation of the three final mode signals in the FIG. 3 antenna system.

Independent control is here achieved by discarding certain outputs available from the junctions 40–45, inclusive, and by combining all other outputs with standard coupling via junctions 70 and 71. This arrangement results in a somewhat reduced independent control capability at a large saving in components. Thus, directional couplers 60, 63, 64, 65 and 66 and hybrid junctions 48 and 51 of FIG. 2 have been discarded and directional couplers 61, 62, 67 and 68 have been replaced with hybrid junctions 70 and 71.

In operation, each of horns 20–31, inclusive, of FIG. 3 will provide a distinct signal as a result of the difference in physical placement of each horn. The first group of hybrid junctions 40–47, 49 and 50 acts as comparison means to provide a plurality of preliminary signals representing sum and difference comparisons of these distinct signals. The second group of hybrid junctions 70 and 71 acts as independent control means to produce three final mode signals representing selective summations of the preliminary signals.

Figure 4:
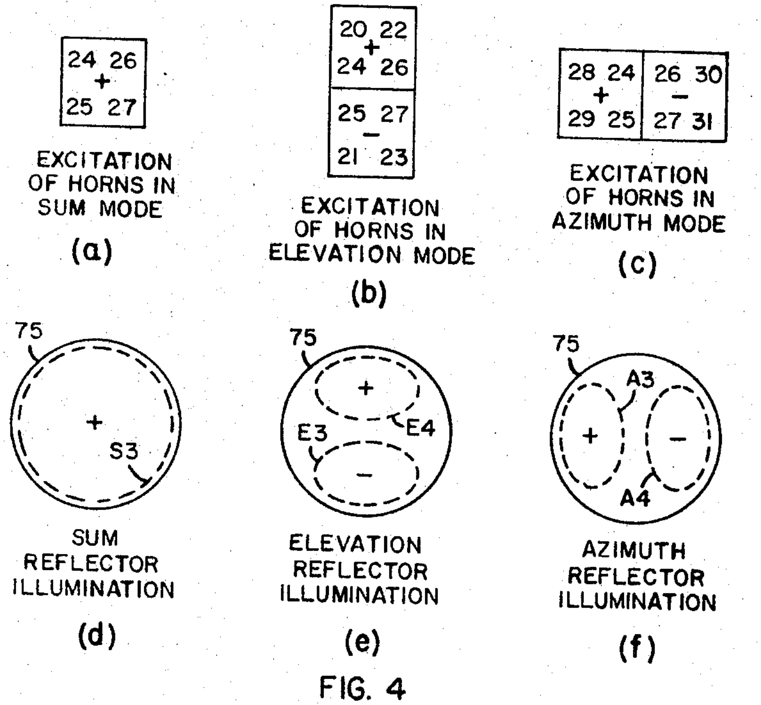

In operation, the twelve horns of FIG. 3 are coupled together for each mode substantially as shown in FIG. 4. In FIG. 4, "*a*," "*b*," and "*c*" may be considered front views of the particular ones of the twelve horns of FIG. 3, which are relied upon in each mode. Thus, horns 24–27, inclusive, are used essentially as one composite horn in the sum mode and are effective to produce the reflector illumination shown as S3 in view "*d*," where 75 represents the reflector or focusing element of the antenna system. The remaining horns of the array 20–31, inclusive, are not utilized in the sum mode.

In the elevation difference mode, horns 20–27, inclusive, are utilized, with the even numbered of these horns providing signals of one polarity and the odd numbered horns coupled with the opposite polarity so as to produce the reflector illumination shown in view "*e*." This illumination has the desired width, and as a result the elevation difference mode would have high gain, low sidelobes, low spillover, and other desirable properties. This is achieved without any degradation of properties in the sum mode.

In the azimuth difference mode, horns 24–31, inclusive, are utilized, with horns 24, 25, 28 and 29 providing signals with a given polarity and horns 26, 27, 30 and 31 interconnected so as to provide opposite polarity signals. The resulting reflector illumination is indicated in view "*f*." This illumination again has the desired width, and so the azimuth difference gain, sidelobes, spillover, and other properties will be good. The sum and elevation difference modes thus retain their desirable properties.

As stated, horns 24–27, inclusive, are used for the sum mode, horns 20–27, inclusive, are used for the elevation difference mode and horns 24–31, inclusive, are used for the azimuth difference mode. Thus, the FIG. 3 arrangement achieves the desired directivity of reflector illumination through effectively changing the feed array size by only using certain horns in each mode. The FIG. 2 arrangement allows the contribution of each horn in each mode to be precisely adjusted rather than just omitting some horns in some modes as the FIG. 3 setup does. It should now be appreciated that the arrangement of FIG. 2 allows complete independent control, while the FIG. 3 arrangement is a more economical system providing a limited but quite useful amount of independent control. Both these arrangements provide substantial advantages over the prior art systems.

The arrangement of FIG. 3 employs twelve horns which are substantially square and equal in size. An alternate arrangement would remove the partitions between the outer eight horns, yielding four rectangular outer horns surrounding four inner square horns. In this case hybrid junctions 40, 42, 43 and 45 would be eliminated (previously, only their sum comparisons were utilized). The performance of this eight-horn arrangement would be substantially the same as that of the twelve-horn arrangement.

FIG. 5.—MULTIMODE HORN

Figure 5:
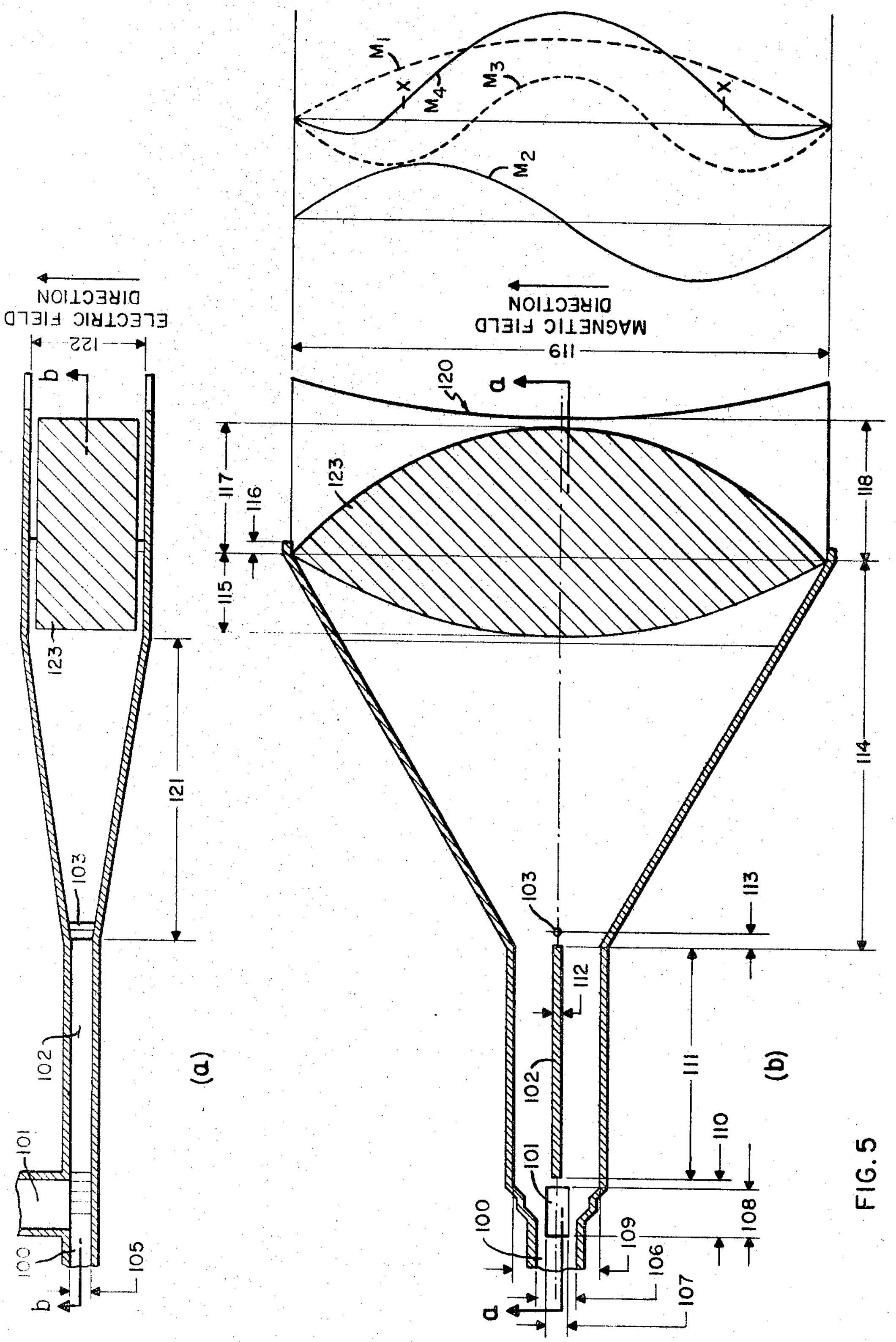

Referring now to FIG. 5 there is illustrated what will be called a multimode horn. This device includes means for independent control of the field distribution at the aperture of the divergent horn, according to the even (sum) or odd (difference) nature of the distribution. The term "multimode" refers to a plurality of natural modes of wave propagation in a waveguide or horn; this should not be confused with "modes of operation" or "final mode signals" which refer to the modes of operation of a complete monopulse antenna system (sum mode, azimuth difference mode, etc.).

It is known that one or more modes of wave propagation can be caused to exist in a waveguide or horn. In operation of the horn illustrated, three modes of propagation are generated in the multimode horn. There are two even horn modes corresponding to $TE_{10}$ and $TE_{30}$ waveguide modes and an odd horn mode corresponding to a $TE_{20}$ waveguide mode. These modes are labeled M1, M3, and M2, respectively, in FIG. 5, and the distribution of the electric field at the horn aperture is indicated for each mode.

To waveguide 101 is coupled a signal representing mode M2. This mode is called an "odd" mode because it is anti-symmetrical in shape and has a positive peak and a negative peak; it closely approximates the ideal field distribution desired for either the azimuth or elevation difference mode. The signal appearing in waveguide 101 can be considered similar to the composite difference signal produced in FIG. 4 by the addition of the outputs of horns 22 and 26 and the subtraction of this signal from the signal resulting from the addition of the outputs of horns 23 and 27.

To waveguide 100 is coupled a signal representing the addition of mode M1 field distribution to the M3 field distribution. This resultant is shown as M4 in FIG. 5; the particular form of the mode M4 is determined by the polarity and amplitude ratios chosen for modes M1 and M3. These modes are called "even" modes because they are symmetrical in shape; the resultant closely approximates the ideal distribution desired for the sum mode.

The signal appearing in waveguide 100 can be considered similar to the composite sum signal produced in FIG. 4 by the addition of the outputs of horns 26 and 27.

Observing wave forms M2 and M4 (the modes which are practically utilized) it will be noted that M2 contains significant levels of electric field over nearly the full width of the horn output. Wave form M4, on the other hand, contains essentially no useful field outward from the points labeled X. This result achieves the desired difference in directivity for the even and odd distributions (or sum and difference modes). In addition, it can be shown through analysis of the shape of the fields produced, that the transverse field distribution of these wave forms results in an antenna pattern in the sum mode which is considerably more efficient than that obtained by using ordinary horns side by side with selective interconnections for the various modes. Such analysis is beyond the scope of this discussion, but is inherent to the illustrated multimode horn.

The design details of a particular multimode horn can be described with particular reference to FIG. 5 and the dimensions applicable to this figure. Two waveguide outputs 100 and 101 are coupled to two internal waveguides by means of a waveguide hybrid junction. The two internal waveguides have one narrow wall or partition 102 in common, and both are coupled to a divergent horn. The common wall 102 ends at the divergent horn and an inductive pin or post 103 is located just forward of this point. The complete multimode horn is an antenna able to effect transistions between guided and free space electromagnetic waves. The partition 102 and post 103, in combination with the other components of the horn, can be regarded as independent control means coupled to the horn for providing preliminary signals representing selective summations of the natural modes. Included in these independent control means is the waveguide hybrid junction already mentioned. This hybrid junction is effective to separate the natural propagation modes according to their even or odd character. The functioning of these components is described in more detail below.

In operation, when waveguide 100 is fed from a transmitter, the two internal waveguides are excited in the same polarity; when 101 is fed, the internal waveguides are excited in opposite polarity. The discontinuities provided by the partition 102 and post 103 generate the proper amount of modes M1 and M3, when the two internal waveguides are excited in the same polarity. Mode M2 is generated when the internal waveguides are excited in opposite polarity. As the waves in modes M1 and M3 travel through the divergent horn, the phase relationship between them is altered so that these modes are combined in the desired manner when they reach the horn aperture, as indicated in FIG. 5. The result is therefore, that when waveguide 100 is fed from a transmitter, modes M1 and M3 are formed and combine to give the desired summation M4; when 101 is fed, the desired mode M2 is formed. Therefore in reception, by reciprocity, preliminary signals are formed at the waveguide hybrid junction providing preliminary signals from the horn representing a selective summation of the even horn modes in one port (waveguide 101) and the odd horn modes in another port (waveguide 100) of the hybrid junction.

A feature of the multimode horn design is the wide frequency band over which the desired results are obtained; this is a consequence of compensation of the inherent frequency dispersion between modes in the divergent horn by an inverse phase characteristic of the wall-end and inductive-pin mode generator combination. Also shown is a dielectric corrective lens at the open end or mouth of the horn. This provides a correction to the wave front that is needed in this particular case; the use of such lenses with divergent horns is well known in the prior art.

It should be realized that the design just described achieves the particular form of independent control desired in the feeds of many monopulse antennas. By utilization of different waveguide mode ratios as well as additional waveguide modes, including mode variations in both planes of operation, complete independent control could, in principle, be obtained in any desired form wherever necessary.

FIG. 6.—ANTENNA SYSTEM WITH MULTIMODE FEED ARRAY

Referring now to FIG. 6, there is shown a monopulse antenna system providing independent control in three modes of operation. This system includes an array of four multimode horns 110–113 having a plurality of outputs, each output providing a distinct signal. These horns are stacked in a vertical direction (the direction of the electric field) and the multimode capability of each horn is effective in the horizontal plane (the direction of the magnetic field). The system further includes comparison means in the form of a first group of hybrid junctions 49 and 50 coupled to the antenna outputs and independent control means in the form of a second group of hybrid junctions 70 and 71 coupled to the first group.

The numbering of these junctions corresponds essentially to the arrangement of FIG. 3. In the FIG. 6 arrangement, the functions of junctions 40–47, inclusive, are provided inherently by the multimode horns 110–113 as was brought out with reference to FIG. 5.

In the operation of the FIG. 6 arrangement, the network connected to the stack of four horns in the vertical direction provides independent control between the sum and elevation difference modes much the same as in the FIG. 3 antenna system. In the horizontal direction the multimode feature of the individual horns provides independent control between the sum and azimuth modes.

The FIG. 6 antenna system provides independent control of all three modes with a rather simple comparator network (compare with comparator 14 of FIG. 1) and only four horns. Each horn requires a more complex, but still practical, design in comparison with simple prior art horns.

Multimode horns constructed for an antenna system as shown in FIG. 6 had the following significant parameters stated in wavelengths (dimensions refer to FIG. 5):

| | |
|---|---|
| Waveguide **100**, inside dimension **105** | 0.41 |
| Waveguide **100**, inside dimension **106** | 0.87 |
| Waveguide **101**, inside dimension **107** | 0.41 |
| Waveguide **101**, inside dimension **108** | 0.87 |
| Diameter of post **103** | 0.029 |
| Inside dimension **109** | 1.69 |
| Dimension **110** | 1.00 |
| Dimension **111** | 4.09 |
| Dimension **112** of partition **102** | 0.044 |
| Dimension **113** | 0.288 |
| Dimension **114** | 7.39 |
| Dimension **115** | 1.47 |
| Dimension **116** | 0.28 |
| Dimension **117** | 2.35 |
| Dimension **118** | 2.46 |
| Dimension **119** | 9.55 |
| Radius of Curve **120** | 36.0 |
| Dimension **121** | 5.86 |
| Dimension **122** | 2.06 |
| Lens **123** | Teflon |

In operation of the antenna system actually constructed, measured performance of the feed alone very closely corresponded to the desired beam widths of radiation; the resulting illumination of the focusing system was tapered down at the edge by very close to the optimum amount in all three modes, sum, azimuth difference, and elevation difference. Measured performance of the complete antenna system demonstrated excellent correlation to the desired results in all three modes: peak gain in both difference modes was less than 3 db below peak sum gain (6 db is usual result), sidelobe suppression in both difference modes was about 23 db (12 db is usual result), and high peak gain and good sidelobe suppression was retained in the sum mode. As far as is known, this is the first time comparable results have been achieved.

The arrangement of FIG. 6 employs a stack of four multimode horns which are substantially the same. An alternate arrangement would substitute a simple single-mode horn for each of the outer two horns, the single-mode horns having an H-plane dimension somewhat smaller than the multimode horns. No mode generators or hybrid junctions would exist in these outer horns (previously, only their sum comparisons were utilized). The performance of this mixed arrangement would be substantially the same as that of the pure multimode stack of horns.

It should be realized that the practical designs just described achieve a close approximation to the particular form of independent control desired in the feeds of many monopulse antennas. By increasing the number of multimode horns in the stack of feeds and by selectively exciting the horns with hybrid junctions and directional couplers, a more complete degree of independent control could be obtained wherever necessary.

It should also be realized that the multimode horns could have the multimode capability in the direction of the electric field, and be stacked in the direction of the magnetic field. Furthermore, various different mode ratios and numbers of modes may be employed.

With the above description of the invention in mind, the following statements may aid in a complete understanding of the invention. The operation of prior art monopulse systems can be summarily stated as follows: Sum mode, all outputs from the feed antennas have been added together; azimuth mode, all outputs from the feed antennas to the left of center have been added together and this composite signal subtracted from the composite signal resulting from the addition of all outputs from feed to the right of the center of the antenna array; elevation mode, all outputs from feed above center have been added together and this composite signal subtracted from the composite signal formed by the addition of all outputs from antennas below the center of the feed array. In practice, the prior art elevation and azimuth signals are actually formed by a series of intermixed additions and subtractions, but the result is the same as if the comparisons were carried out as stated above with just one subtraction in each difference mode.

The present invention includes the realization that the way to get patterns of similar directivity in each mode of operation of a monopulse feed array is to change the size of the array, either actually or effectively (as by use of multimode horns), for each of the various modes involved. The invention also includes the concept that independent control of a plurality of monopulse modes of operation can be achieved by carrying out all summations after comparison selectively according to the mode. In this selective process, in forming particular mode signals certain outputs are either completely ignored or are included only after being reduced in magnitude by a desired amount. A further concept included in the invention is that independent control of a plurality of monopulse modes of operation can also be achieved by selective summation of a series of odd and even natural modes of propagation in the antenna.

Although the invention has been described in the particular configuration of a monopulse radar system, it is to be understood that the invention may be applied to other types of antenna systems. For example, one method for obtaining a sequentially-lobing or conical-scanning antenna is to combine the sum and difference signals of a monopulse antenna through switches or modulators. If a prior art monopulse antenna is employed for this purpose, the resulting sequential-lobing antenna displays poor performance characteristics. However, when independent control means, in accordance with this invention, are provided in the monopulse portion, the sequential-lobing characteristics can be substantially improved.

It should also be appreciated that with relation to monopulse systems, the invention is applicable to antenna arrays which may include any desired numbers of antennas of any applicable configuration. Also it may be desired in some applications to include multimode horns in combination with other types of antennas.

The invention is described with particular reference to a transmitting or receiving antenna system for convenience at various points, but it is to be clearly understood that it is equally applicable to both kinds.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A monopulse antenna system providing independent control in a sum and two difference modes of operation comprising: a central group of four antennas arranged to simultaneously form upper and lower pairs of antennas and left and right pairs of antennas; an outer group of antennas including antennas above, below, right, and left of said four central antennas; a first group of hybrid junctions combining signals from the four central antennas to form a final sum mode signal, a preliminary elevation difference mode signal, and a preliminary azimuth difference mode signal; a second group of hybrid junctions combining signals from the upper and lower outer antennas with said preliminary elevation difference mode signal to form a final elevation difference mode signal; and a third group of hybrid junctions combining signals from the right and left outer antennas with said preliminary azimuth difference mode signal to form a final azimuth difference mode signal.

2. An antenna system in accordance with claim 1, which additionally includes a focusing system in spaced relationship to said antennas.

3. An antenna system in accordance with claim 1, wherein said outer group of antennas consists of two antennas above, two antennas below, two antennas to the right, and two antennas to the left of said four central antennas.

References Cited by the Examiner

UNITED STATES PATENTS

| | | | |
|---|---|---|---|
| 2,751,586 | 6/1956 | Riblet | 343—772 X |
| 2,759,154 | 8/1956 | Smith et al. | 343—786 X |
| 2,818,549 | 12/1957 | Adcock | 343—16 |
| 2,830,288 | 4/1958 | Dicke | 343—776 X |
| 2,918,673 | 12/1959 | Lewis et al. | 343—778 X |
| 2,925,595 | 2/1960 | Thourel | 343—778 X |
| 2,931,033 | 3/1960 | Miller | 343—161 |
| 3,045,238 | 7/1962 | Cheston | 343—786 |

FOREIGN PATENTS

| | | |
|---|---|---|
| 1,244,969 | 9/1960 | France. |

ELI LIEBERMAN, *Primary Examiner.*

GEORGE N. WESTBY, *Examiner.*

HERMAN KARL SAALBACH, *Assistant Examiner.*